(12) United States Patent
Rosen

(10) Patent No.: US 8,727,049 B1
(45) Date of Patent: May 20, 2014

(54) EFFICIENT HYBRID VEHICLE

(75) Inventor: Eitan Rosen, Abirim (IL)

(73) Assignee: Marvell International Ltd., Hamilton (BM)

( * ) Notice: Subject to any disclaimer, the term of this patent is extended or adjusted under 35 U.S.C. 154(b) by 37 days.

(21) Appl. No.: 13/528,703

(22) Filed: Jun. 20, 2012

Related U.S. Application Data

(63) Continuation-in-part of application No. 12/267,326, filed on Nov. 7, 2008, now abandoned.

(60) Provisional application No. 60/986,110, filed on Nov. 7, 2007.

(51) Int. Cl.
*B60W 10/06* (2006.01)
*B60W 10/08* (2006.01)
*B60W 10/24* (2006.01)

(52) U.S. Cl.
USPC .............. 180/65.265; 180/65.28; 180/65.285; 701/22

(58) Field of Classification Search
USPC ................. 180/65.21, 65.265, 65.28, 65.285, 180/65.29; 903/930; 701/1, 22, 99, 101, 701/117
See application file for complete search history.

(56) References Cited

U.S. PATENT DOCUMENTS

| | | | |
|---|---|---|---|
| 6,014,607 A | 1/2000 | Yagyu et al. | |
| 6,314,347 B1 | 11/2001 | Kuroda et al. | |
| 6,615,130 B2 | 9/2003 | Myr | |
| 6,636,787 B2 | 10/2003 | Yamaguchi et al. | |
| 7,360,615 B2 * | 4/2008 | Salman et al. | 180/65.265 |
| 7,539,562 B2 | 5/2009 | Maguire et al. | |
| 7,869,906 B2 | 1/2011 | Louch et al. | |
| 2004/0034460 A1 * | 2/2004 | Folkerts et al. | 701/54 |
| 2007/0112475 A1 | 5/2007 | Koebler et al. | |
| 2008/0319666 A1 | 12/2008 | Petrov et al. | |

\* cited by examiner

*Primary Examiner* — John Walters

(57) ABSTRACT

Embodiments of the present disclosure provide a method comprising providing a first adaptive threshold of charge for a battery within a hybrid vehicle and based upon the first adaptive threshold of charge for the battery, operating the hybrid vehicle in a mode of operation. The method also comprises automatically analyzing at least one condition and based upon the automatically analyzing at least one condition, automatically altering the first adaptive threshold of charge for the battery to provide a second adaptive threshold of charge for the battery that is different from the first adaptive threshold. Based upon automatically altering the first adaptive threshold of charge for the battery to provide a second adaptive threshold of charge for the battery, (i) a proportional use of power to be supplied by a fuel engine component and/or (ii) a proportional use of power to be supplied by an electric engine component is automatically altered.

25 Claims, 4 Drawing Sheets

EFFICIENT HYBRID VEHICLE

CROSS REFERENCE TO RELATED APPLICATIONS

The present application is a continuation-in-part application of U.S. patent application Ser. No. 12/267,326, filed Nov. 7, 2008, which claims priority to U.S. Patent Application No. 60/986,110, filed Nov. 7, 2007, entitled "Efficient Use Of Hybrid Car Battery," the entire specifications of which are hereby incorporated by reference in their entireties for all purposes, except for those sections, if any, that are inconsistent with this specification.

TECHNICAL FIELD

Embodiments of the present disclosure relate to hybrid vehicles, and more particularly, to systems and methods for efficient use of battery power in a hybrid vehicle.

BACKGROUND

Hybrid vehicles have become increasingly popular in recent years. This is due to many factors such as, for example, the relative efficiency of hybrid vehicles, the rising cost of energy and an increased desire in society for more environmentally friendly modes of transportation.

Hybrid vehicles typically have a gasoline or diesel powered engine and an electric powered engine. The electric powered engine is powered by one or more batteries. Generally, instead of charging the battery via an electrical outlet, surplus energy from operation of the hybrid vehicle is used to charge the battery via a generator powered by the surplus energy. Surplus energy may be obtained, for example, during use of the gasoline powered engine, during breaking or slowing down of the hybrid vehicle, or when the hybrid vehicle is travelling downhill. Hybrid vehicles may operate in a gasoline engine-only mode, an electric engine-only mode, and a mix of the two modes, wherein the proportionality of the gasoline engine and the electric engine may vary. Those skilled in the art will understand that some hybrid vehicles utilize other types of engines, as opposed to an electric engine, in combination with the typical gasoline or diesel engine, and thus, other forms of energy storage in place of batteries. For example, compressed air is an emerging option to replace batteries. A pneumatic engine and compressor combination may replace the electric engine and generator combination, where the compressor is powered by surplus energy. Thus, as used herein, the term "electrical power" includes other forms of alternative power.

Currently, batteries for hybrid vehicles are generally maintained at a "steady state" charge of 70% of capacity, for example. This allows for recharging of the battery when the hybrid vehicle slows down or drives downhill since it is not at 100% of capacity. Conversely, with a steady state charge of 70% the battery may also have sufficient capacity to supply energy in order to, for example, accelerate the car, or to power up a short incline. Although steady state charging to 70% capacity may provide a suitable default for many conditions, it may be more efficient in some conditions to charge the battery to different levels in order to enable an improved utilization of the electrical powered engine, reduction of battery requirements and the like.

SUMMARY

The present disclosure provides a method comprising providing a first adaptive threshold of charge for a battery within a hybrid vehicle and based upon the first adaptive threshold of charge for the battery, operating the hybrid vehicle in a mode of operation that utilizes at least one of (i) a fuel engine component and (ii) an electric engine component to move the hybrid vehicle. The mode of operation involves (i) a proportional use of power to be supplied by the fuel engine component for moving the hybrid vehicle and/or (ii) a proportional use of power to be supplied by the electric engine component for moving the hybrid vehicle. Power supplied by the electric engine component is based upon energy supplied by the battery. The method also comprises automatically analyzing at least one condition and based upon the automatically analyzing at least one condition, automatically altering the first adaptive threshold of charge for the battery to provide a second adaptive threshold of charge for the battery that is different from the first adaptive threshold. The method further comprises, based upon the automatically altering the first adaptive threshold of charge for the battery to provide a second adaptive threshold of charge for the battery, automatically altering (i) the proportional use of power to be supplied by the fuel engine component for moving the hybrid vehicle and/or (ii) the proportional use of power to be supplied by the electric engine component for moving the hybrid vehicle.

The present disclosure also provides an apparatus comprising a data module configured to at least one of obtain and store data relating to at least one condition, a processing module configured to analyze the data relating to at least one condition, and a management module. The management module is configured to, based upon analyzing the data relating to at least one condition, alter a first adaptive threshold of charge for a battery of a hybrid vehicle to provide a second adaptive threshold of charge for the battery, wherein the first adaptive threshold is different from the second adaptive threshold. The management module is also configured to, based upon the first adaptive threshold of charge for the battery, define a proportional utilization of different engine components by the hybrid vehicle, wherein the proportional utilization comprises at least one of (i) a proportional use of power to be supplied by a fuel engine component for moving the hybrid vehicle and/or (ii) a proportional use of power to be supplied by an electric engine component for moving the hybrid vehicle, and wherein power supplied by the electric engine component is based upon energy supplied by the battery. The management module is further configured to, based upon altering the first adaptive threshold of charge for the battery of the hybrid vehicle to provide a second adaptive threshold of charge for the battery, alter (i) the proportional use of power to be supplied by the fuel engine component for moving the hybrid vehicle and/or (ii) the proportional use of power to be supplied by the electric engine component for moving the hybrid vehicle.

The present disclosure also provides a hybrid vehicle comprising a chassis, a fuel engine component coupled to the chassis, an electric engine component coupled to the chassis, a battery associated with at least one of (i) the fuel engine component and (ii) the electric engine component, and a control system associated with (i) the fuel engine component, (ii) the electric engine component and (iii) the battery. The control system comprises a data module configured to at least one of obtain and store data relating to at least one condition, a processing module configured to analyze the data relating to at least one condition, and a management module. The management module is configured to, based upon analyzing the data relating to at least one condition, alter a first adaptive threshold of charge for the battery of the hybrid vehicle to provide a second adaptive threshold of charge for the battery, wherein the first adaptive threshold is different from the second adaptive threshold. The management module is also configured to, based upon the first adaptive threshold of charge for the battery, define a proportional utilization of different engine components by the hybrid vehicle, wherein the proportional utilization comprises at least one of (i) a proportional use of power to be supplied by a fuel engine component for moving the hybrid vehicle and/or (ii) a proportional use of power to be supplied by an electric engine component for moving the hybrid vehicle, and wherein power supplied by the electric engine component is based upon energy supplied by the battery. The management module is further configured to, based upon altering the first adaptive threshold of charge for the battery of the hybrid vehicle to provide a second adaptive threshold of charge for the battery, alter (i) the proportional use of power to be supplied by the fuel engine component for moving the hybrid vehicle and/or (ii) the proportional use of power to be supplied by the electric engine component for moving the hybrid vehicle.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Embodiments of the disclosure are illustrated by way of example and not by way of limitation in the figures of the accompanying drawings.

DETAILED DESCRIPTION OF THE EMBODIMENTS

Figure 1:
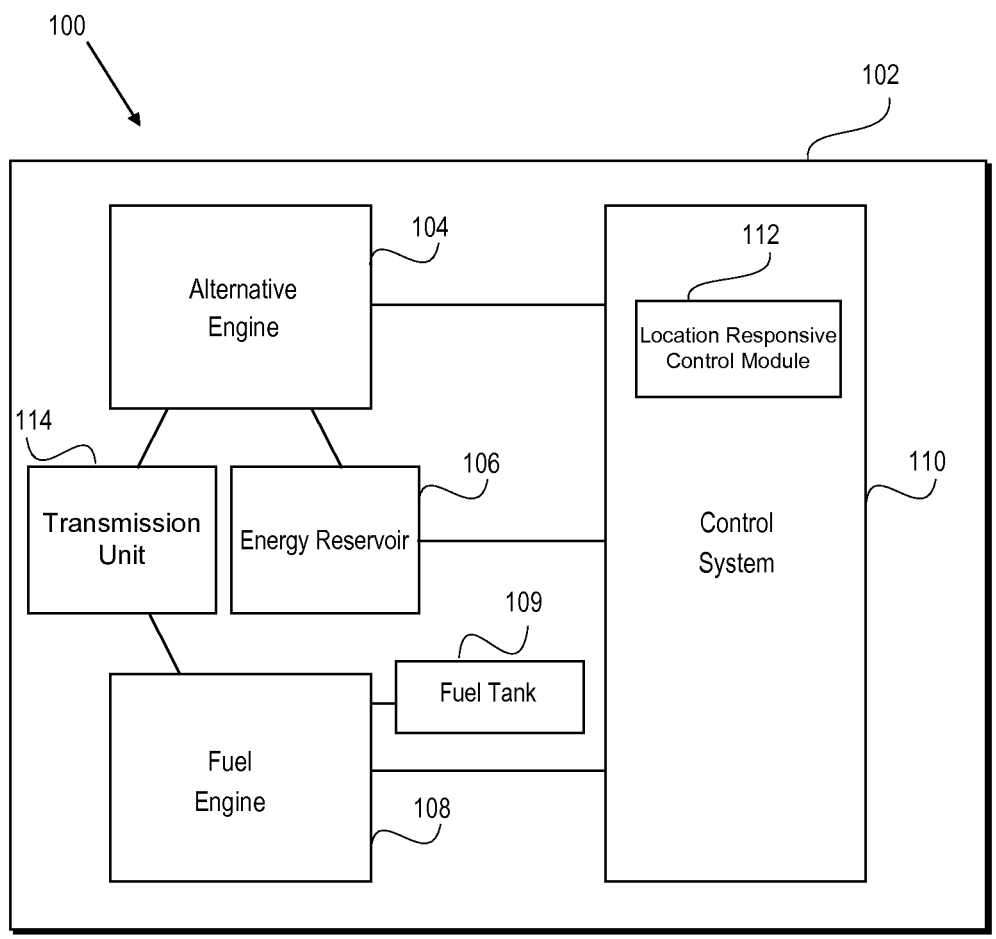
FIG. 1 schematically illustrates examples of various components of a hybrid vehicle.

FIG. 1 schematically illustrates an example of various components of a hybrid vehicle 100. The hybrid vehicle 100 includes a chassis 102, an alternative power engine 104, an energy reservoir 106, a fuel engine 108 and a fuel tank 109. A control system 110 is provided for controlling and/or aiding in the control of the hybrid vehicle 100. In accordance with an embodiment, the control system 110 includes a location responsive control module 112 that aids in control of the hybrid vehicle 100 based on its current or anticipated location and/or other conditions such as driver habits. The hybrid vehicle 100 also includes a transmission unit 114 that is controlled by the control system 110 and that is driven/powered by the fuel engine 108 and/or the alternative power engine 104. In accordance with an embodiment, the transmission unit 114 may not be included and the alternative power engine 104 may be coupled to one wheel (not illustrated) of the hybrid vehicle 100 while the fuel engine 108 may be coupled to another wheel (not illustrated) of the hybrid vehicle 100. In such an embodiment, the alternative power engine 104 and the fuel engine 108 are used to drive/provide power to the respective wheels to which the alternative power engine 104 and the fuel engine 108 are coupled. Examples of hybrid vehicles 100 include, but are not limited to, cars, sport utility vehicles, trucks, recreational vehicles, buses, motorcycles, etc.

Hybrid vehicles are generally known in the art, as is their general operation. For example, the alternative power engine 104 may be an electric engine that drives the transmission unit 114 and may generate electrical power. In accordance with such an embodiment, the energy reservoir 106 may comprise one or more batteries. The energy reservoir 106 may also include a generator for providing power to the alternative power engine 104. Another example of an alternative power engine 104 is a pneumatic engine and compressor combination, where the pneumatic engine drives the compressor to pump air into a compressed air tank. The compressed air can be used by the fuel engine 108 to provide power using less fuel when desired.

The fuel engine 108 may be powered by various fuels such as, for example, gasoline, diesel, hydrogen, etc. The fuel may be stored in the fuel tank 109. The fuel engine 108 may be used as an overall power source for the hybrid vehicle 100, as with standard motor vehicles, in order to move the hybrid vehicle 100 via the transmission unit 114 and to drive a generator (not shown) that provides electric power to the hybrid vehicle 100. Alternatively, the alternative power engine 104 may be used as an overall power source for the hybrid vehicle 100 in order to move the hybrid vehicle via the transmission unit 114 when overall power requirements are low, such as, for example, during slow traffic or when the overall power consumption of the hybrid vehicle 100 is low and to provide auxiliary power for the hybrid vehicle 100 when extra power is needed, i.e., during acceleration. The alternative power engine 104 may also be used for shorter periods of time as an overall power source for the hybrid vehicle 100 when power requirements are high. For clarity and ease of understanding, the alternative power engine 104 will henceforth be referred to herein as electric engine 104, while the energy reservoir 106 will be referred to as battery 106. This is not to be construed as limiting in any way.

While newer models of hybrid vehicles may include a connection for coupling to an external electrical source in order to charge the battery 106, other models, especially earlier models, of hybrid vehicles do not. Thus, the battery 106 is generally charged via operation of the fuel engine 108 via a generator (not illustrated) and/or by energy recovered from axles that propel the wheels of the hybrid vehicle 100 during such times as when the hybrid vehicle 100 is braking or decelerating, or when the hybrid vehicle 100 is coasting or going downhill. Such energy may be referred to as surplus energy.

In accordance with an embodiment, an adaptive threshold of charge is provided for the battery 106. For example, a default adaptive threshold of charge for the battery 106 may be set as 70%. Thus, energy from the battery 106 may be used, among other things, to propel the hybrid vehicle 100 via the electric engine 104, alone or in addition to the fuel engine 108, when the battery 106 has a charge in a range of 70% to 100% of capacity. However, in an embodiment, when the charge of the battery 106 hits 70% or goes below 70%, then the control system 110 causes the hybrid vehicle 100 to reduce or even stop drawing power from the battery 106. Thus, when charge is at or below 70% of capacity, the hybrid vehicle 100 may reduce or even stop use of the electric engine 104 as a power source for moving the hybrid vehicle 100. Moreover, when the battery charge level is at or below the threshold, the control system 110 may cause the battery 106 to be charged, in an embodiment, either by the fuel engine 108 via a generator and/or by energy recovered from axles that propel the wheels of the hybrid vehicle 100 during such times as when the hybrid vehicle 100 is braking or decelerating, or when the hybrid vehicle 100 is coasting or going downhill. In an embodiment, the control system 110 waits to have the battery 106 charged, even though the charge level is below the fullness threshold, until surplus energy is available to be used to charge the battery 106.

The control system 110 may generally be used to control the overall operation of the hybrid vehicle 100. User input may also be provided to control various aspects of the hybrid vehicle 100. For example, many hybrid vehicles offer the operator the option of selecting manually an all-electric mode such that the hybrid vehicle 100 will operate totally from the electric engine 104 and the battery 106 based upon such user input. In accordance with various embodiments, the location responsive control module 112 may control various operations of the hybrid vehicle 100 in response to one or more of a current location, an anticipated or predicted location, and/or a past location.

Figure 2:
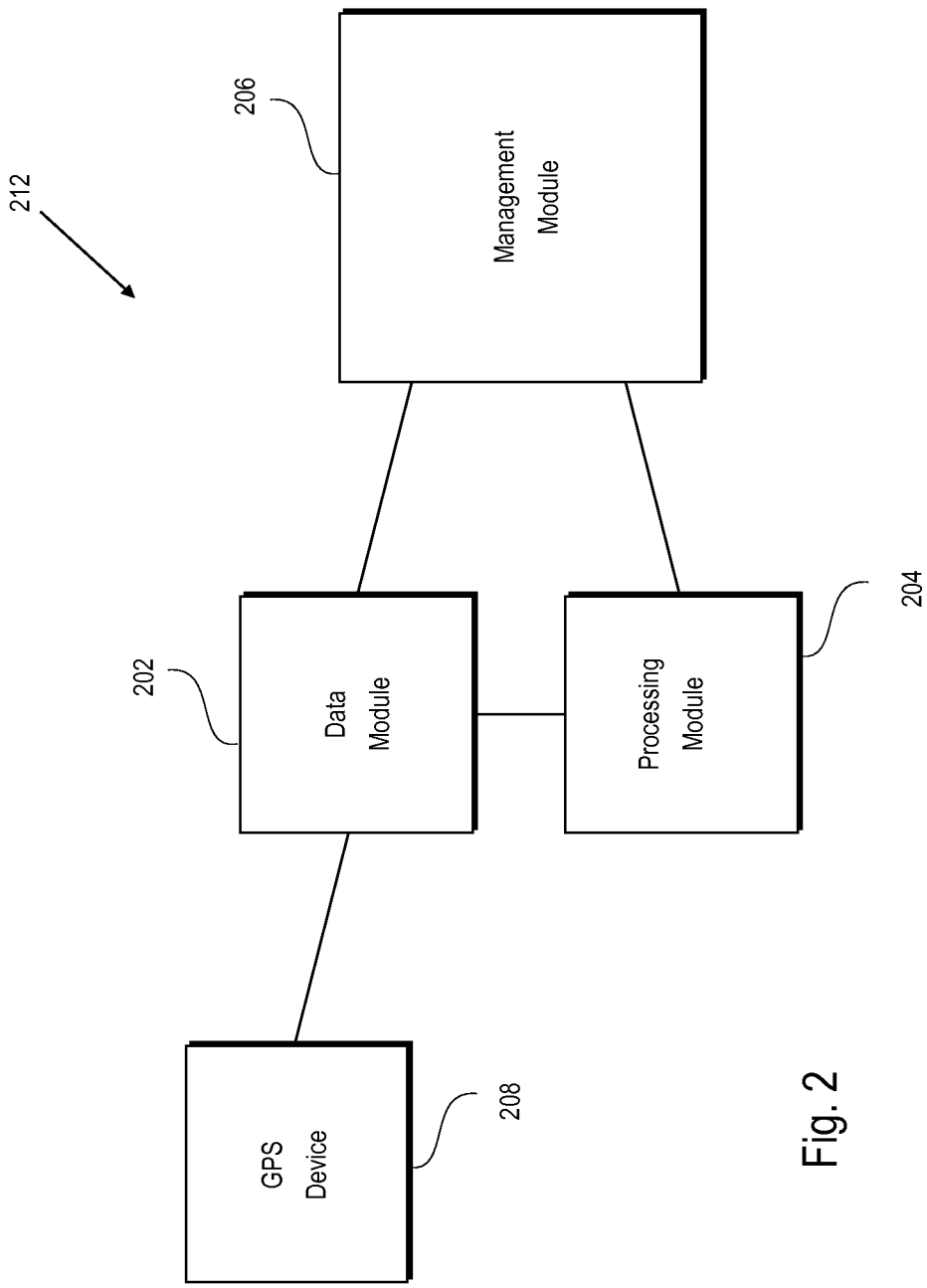
FIG. 2 schematically illustrates a control system for a hybrid vehicle.

FIG. 2 schematically illustrates a control system 212 that may be suitable to use as location responsive control module 112, in accordance with various embodiments of the present disclosure. The control system 212 includes a data module 202, a processing module 204, and a management module 206. The data module 202 may receive and/or store data related to, for example, terrain, driving history and habits, junctions, etc. The management module 206 may control various aspects of operation of the hybrid vehicle 100, including selection of a fuel engine mode of operation, an electric engine mode of operation and a combination of the two including the proportionality between the two modes.

In accordance with an embodiment of the disclosure, the management 206 controls the proportional usage of the different engine components, for example the fuel engine 108 and the electric engine 104, by the hybrid vehicle 100. In accordance with an embodiment, the management module 206 alters the adaptive threshold of charge for the battery 106, as will be discussed in more detail herein. The processing module 204 may process various data input to and/or stored by the data module 202 and may provide such processed data to the management module 206. The data module 202 may store generally known data or may receive data from various external sources, either from within the hybrid vehicle 100 or from outside the hybrid vehicle 100.

It is noted that the modules 202, 204 and 206 may be realized as discreet components or modules, as seen in FIG. 2, or combined together as one or two modules. For example, the processing module 204 and management module 206 may be realized as a single module. Likewise, one or more of modules 202, 204 and 206 may be realized in various combinations with various other modules that may be included within the control system 212.

In accordance with embodiments of the present disclosure, the hybrid vehicle 100 may be provided with a Global Positioning System (GPS) device 208 and may be used to provide position information relating to the hybrid vehicle 100. GPS is being used herein in a generic sense and thus, GPS device 208 includes any suitable device that provides position information. Position information includes, for example, providing a current position of the hybrid vehicle 100, as well as a predicted position of the hybrid vehicle based upon maps either stored within data module 202 of the control system 212 of the hybrid vehicle 100 or provided from an external source to the GPS device. Likewise, information related to traffic conditions, road conditions, weather conditions, etc. may also be provided via the GPS device via an external source. Alternatively, traffic conditions may be provided via another form of communication, for example via a service from cellular phone operators that may or may not rely on information received from a GPS device.

The GPS device 208 may be a dedicated GPS device associated with vehicle 100, a dedicated stand-alone device, or it may also be in the form of a mobile personal electronic device such as, for example, a cell phone, a PDA, etc. Many of these devices in today's society include a GPS, or other positioning feature or function. Thus, an operator of the hybrid vehicle 100 may use the GPS feature of their mobile device to provide position information to the control system 212 of the hybrid vehicle 100. The information may be communicated either wirelessly to the control system 212 or via a communication conduit, i.e., a hardwire connection to which the mobile device is connected.

In accordance with various embodiments of the present disclosure, a mode of operation for the hybrid vehicle 100 may be initially provided within the control system 212. This initial mode of operation may be a default operation or may be based upon various aspects of the present disclosure as will be further discussed herein. Such modes of operation may include, but are not limited to, operating the hybrid vehicle 100 in a fuel engine-only mode, operating the hybrid vehicle 100 in an electric engine-only mode, operating the hybrid vehicle 100 in a mixed fuel engine/electric engine mode, and charging the battery of the hybrid vehicle. It is noted that in an embodiment of the disclosure, the modes of operation may be combined. For example, when in an electric engine-only mode of operation, during deceleration of the hybrid vehicle 100 or when the hybrid vehicle 100 is going downhill, the battery 106 may be charged and thus the mode of operation is a combination of electric engine-only and charging the battery. Similarly, the fuel engine 108 may be used to charge the battery 106 when the hybrid vehicle is operating in a fuel engine-only mode. Furthermore, the mode of operation for a mixed fuel engine/electric engine mode may vary in its proportionality, i.e., 80% gasoline engine and 20% electric engine, 60% electric engine and 40% fuel engine, etc.

In accordance with an embodiment of the present disclosure, a mode of operation for the hybrid vehicle 100 may be altered depending upon various conditions. For example, using position knowledge, depending upon a hybrid vehicle's current position and its current path of travel, the control system may realize that the hybrid vehicle 100 must pass over hill. Thus, the control system 212 may determine that switching to an electric engine-only mode to go up the hill, and allowing the battery to be depleted to a greater extent than usual, is an efficient use of battery power since the charge that is depleted in going up the hill may be readily replenished by recharging the battery 106 as soon a the hybrid vehicle crests the hill and goes down the other side.

Thus, if it is determined from position information that the hybrid vehicle 100 is on level ground, but approaching a downhill path, the mode of operation may be to deplete battery charge to a greater extent than usual, i.e., use electric engine-only mode to drive the hybrid vehicle in order to save fuel and to also free up battery capacity for an upcoming charge that is likely to be generated during the upcoming downhill travel. Likewise, if it is determined that the hybrid vehicle is on a road that includes an approaching uphill path, then the mode of operation may be to maximally charge the battery so that power assistance from the electric engine 104 is maximally available to assist the fuel engine 108 for the climb. This mode may economize use of the stored charge throughout the climb when the length of upward path is known. Furthermore, if it is determined that the hybrid vehicle 100 is approaching a junction in which different turning options have different terrain, by understanding upcoming terrain, and/or traffic conditions and/or driver selections made during previous visits to the junction in similar conditions, modes for combining fuel and energy usage may be optimized accordingly.

Thus, by maintaining histories of operation of the hybrid vehicle 100 based upon, for example driving patterns and routes taken, as well as the time and day, predicted patterns for use of the hybrid vehicle 100 may be determined. For example, if an operator of the hybrid vehicle 100 uses the hybrid vehicle 100 to drive between home and work Monday through Friday at 8:00 am, data relating to typical routes taken, driving patterns and the time/day may be stored within the data module 202. The processing module 204 may process data from the data module 202 related to the current day and time in order to predict that the hybrid vehicle is traveling between home and work. Thus, the management module 206 may initially select a mode of operation appropriate for the route(s) between home and the workplace in order to maximize use of the fuel engine 108 and/or the electric engine 104, and thereby facilitate optimization of economy of operation of hybrid vehicle. The management module 206 selection of a mode of operation also facilitates optimization of using charge within the battery 106 and charging of the battery 106. Such a mode of operation may be confirmed with current positioning information from a Global Positioning System (GPS) device. Additionally, given a known driving pattern based upon history, electrical power may be used throughout acceleration when final driving speed is estimated based on location, time of day and driving history.

Once a mode of operation has been selected or altered, the mode of operation may be followed or maintained until one or more factors change or a threshold is reached. Such factors include a change of state of one or more factors, i.e., change of route, change of terrain, lapsing of a predetermined amount of time, etc. For example, if a mode of operation was selected or determined based upon a predicted path of travel and the hybrid vehicle does not maintain the predicted path of travel, then the mode of operation may be further altered based upon further analysis, or a default mode of operation may be used. The default mode of operation may be an overall default mode of operation or may be a previous mode of operation, including the initial mode of operation, that was selected at some point during the current use of the hybrid vehicle.

In accordance with an embodiment, the adaptive threshold of charge for the battery 106 may be altered in a manner as previously described with respect to altering the mode of operation of the hybrid vehicle 100. The mode of operation of the hybrid vehicle 100 may be then altered based upon altering the adaptive threshold of charge for the battery 106.

More particularly, in accordance with an embodiment of the present disclosure, a mode of operation for moving the hybrid vehicle 100 may be initially provided within the control system 212. This initial mode of operation may be a default operation. As previously noted, such modes of operation may include, but are not limited to, operating the hybrid vehicle 100 in a fuel engine-only mode, operating the hybrid vehicle 100 in an electric engine-only mode, operating the hybrid vehicle 100 in a mixed fuel engine/electric engine mode, and charging the battery of the hybrid vehicle. It is noted that in an embodiment of the disclosure, the modes of operation may be combined. For example, when in an electric engine-only mode of operation, during deceleration of the hybrid vehicle 100 or when the hybrid vehicle 100 is going downhill, the battery 106 may be charged and thus the mode of operation is a combination of electric engine-only and charging the battery. Similarly, the fuel engine 108 may be used to charge the battery 106 via a generator (not illustrated) when the hybrid vehicle is operating in a fuel engine-only mode. Furthermore, as previously noted, the mode of operation for a mixed fuel engine/electric engine mode may vary in its proportionality, i.e., 80% gasoline engine and 20% electric engine, 60% electric engine and 40% fuel engine, etc.

For each mode of operation, a default adaptive threshold of charge for the battery 106 may be provided. The default adaptive threshold of charge for the battery 106 may be the same for each mode of operation or may vary for each mode of operation. For example, the default adaptive threshold may be set at 70% for all modes of operation, or may be set at 70% for the fuel engine-only mode and the mixed fuel engine/electric engine mode, while the default adaptive threshold for the electric engine-only mode may be set at 20%.

Once the adaptive threshold is reached (or the charge of the battery 106 drops below the threshold), then the mode of operation may be changed and the battery 106 can be charged to reach or exceed the adaptive threshold. The mode of operation can then remain as is or can go back to the original mode of operation depending upon conditions as previously discussed herein.

In accordance with an embodiment of the present disclosure, the adaptive threshold of charge for the battery 106 may be altered depending upon various conditions as previously discussed herein. For example, using position knowledge, depending upon a hybrid vehicle's current position and its current path of travel, the control system may realize that the hybrid vehicle 100 must pass over hill. Thus, the control system 212 may alter the adaptive threshold of charge for the battery 106 and switch to an electric engine-only mode (or to a mode that provides for increased proportional use of the electric motor) to go up the hill. The location of the adaptive threshold and/or the proportionality of use of the electric motor relative to the fuel engine may be adjusted based on the length and/or steepness of an upcoming hill, for example. In this manner the battery may be depleted to a greater extent than usual, making for a more efficient use of battery power since the charge that is depleted in going up the hill may be readily replenished by recharging the battery 106 as soon as the hybrid vehicle crests the hill and goes down the other side of the hill. Thus, in an example, the adaptive threshold of charge for the battery 106 may be lowered to, for example, 20%. If the hybrid vehicle 100 does not reach the crest of the hill before the battery reaches the threshold, then the mode of operation may be switched to another mode of operation, for example, fuel-engine only mode. The charge of the battery 106 can then be replenished as the hybrid vehicle 100 travels down the other side of the hill and/or as the hybrid vehicle travels along after reaching the crest, i.e. there is no downside of the hill at this point in the hybrid vehicle's travel. Also, once over the crest of a hill, the adaptive threshold of charge for the battery 106 can then be returned to the default adaptive threshold, or another adaptive threshold depending upon analysis of the various topographical and/or traffic and/or other conditions as previously discussed herein.

Thus, if it is determined from position information that the hybrid vehicle 100 is on level ground, but approaching a downhill path, the adaptive threshold of charge for the battery 106 may be lowered to allow for depletion of battery charge to a greater extent than usual, i.e., use electric engine-only mode to drive the hybrid vehicle in order to save fuel and to also free up battery capacity for an upcoming charge that is likely to be generated during the upcoming downhill travel. Likewise, if it is determined that the hybrid vehicle is on a road that includes an approaching uphill path, then the adaptive threshold of charge for the battery 106 may be increased to maximally charge the battery so that power assistance from the electric engine 104 is maximally available to assist the fuel engine 108 for the climb. This allows for economizing use of the stored charge throughout the climb when the length of upward path is known. Furthermore, if it is determined that the hybrid vehicle 100 is approaching a junction in which different turning options have different terrain, by understanding upcoming terrain, and/or traffic conditions and/or driver selections made during previous visits to the junction in similar conditions, altering of the adaptive threshold charge for the battery 106 may be further optimized accordingly.

As previously noted, by maintaining histories of operation of the hybrid vehicle 100 based upon, for example driving patterns and routes taken, as well as the time and day, predicted patterns for use of the hybrid vehicle 100 may be determined. For example, if an operator of the hybrid vehicle 100 uses the hybrid vehicle 100 to drive between home and work Monday through Friday at 8:00 am, data relating to typical routes taken, driving patterns and the time/day may be stored within the data module 202. The processing module 204 may process data from the data module 202 related to the current day and time in order to predict that the hybrid vehicle is traveling between home and work. Thus, the management module 206 may initially select an adaptive threshold of charge for the battery 106, as well as a mode of operation appropriate for the selected adaptive threshold of charge, appropriate for the route(s) between home and the workplace in order to maximize use of the fuel engine 108 and/or the electric engine 104, and thereby facilitate optimization of economy of operation of hybrid vehicle. The management module 206 selection of an adaptive threshold of charge for the battery 106 also facilitates optimization of using charge within the battery 106 and charging of the battery 106. Such an adaptive threshold of charge for the battery 106 may be confirmed with current positioning information from a Global Positioning System (GPS) device. The initial adaptive threshold of charge for the battery 106 may always be a default adaptive threshold of charge if desired. Once the hybrid vehicle 100 begins travelling, the management module 206 may confirm the predicted route for the hybrid vehicle 100.

Once an adaptive threshold of charge for the battery 106 has been selected or altered, a mode of operation may be followed or maintained until one or more factors change or the adaptive threshold is reached. Such factors include reaching or dropping below the adaptive threshold of charge, a change of state of one or more factors, i.e., change of route, change of terrain, lapsing of a predetermined amount of time, etc. For example, if an adaptive threshold of charge for the battery 106 was selected or determined based upon a predicted path of travel and the hybrid vehicle 100 does not maintain the predicted path of travel, then the adaptive threshold of charge for the battery 106 may be altered based upon further analysis, or a default adaptive threshold of charge may be selected. The default adaptive threshold of charge may be an overall default adaptive threshold of charge or may be a previous adaptive threshold of charge, including the initial adaptive threshold of charge, that was selected at some point during the current use of the hybrid vehicle 100.

Figure 3:
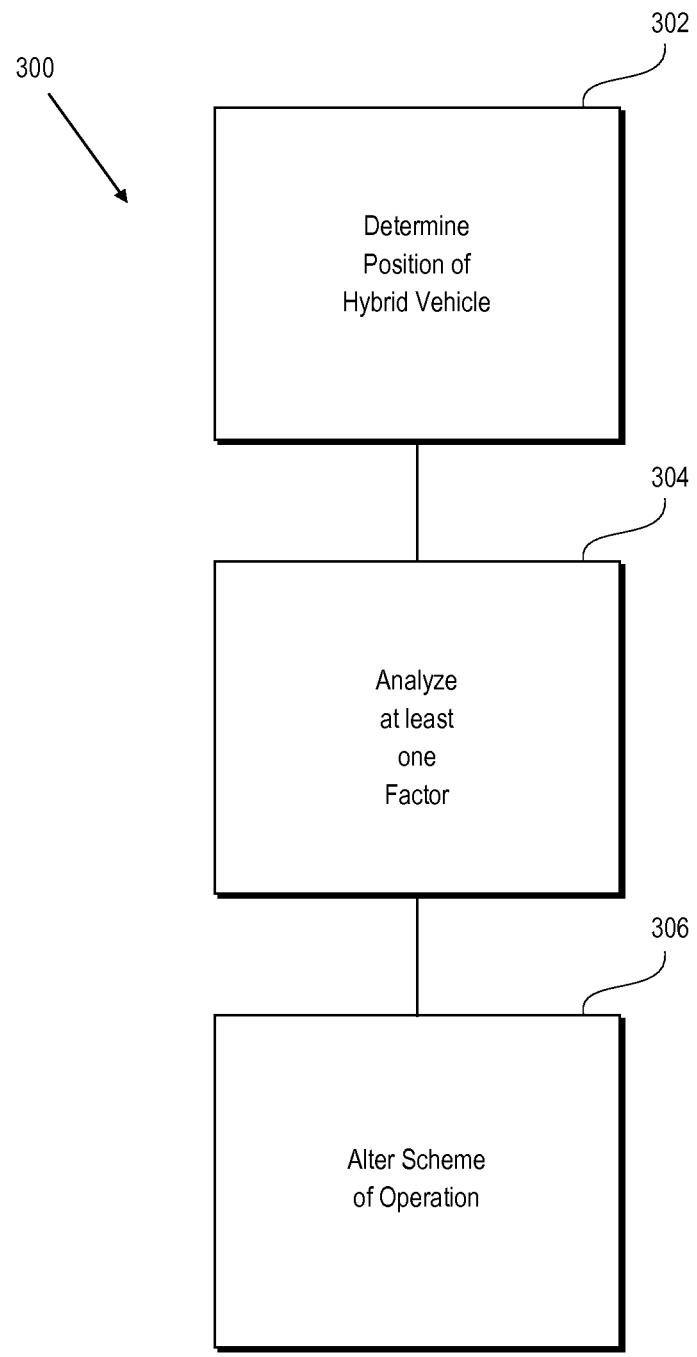
FIG. 3 is flow diagram of a method for managing modes of operation for a hybrid vehicle.

Referring now to FIG. 3, in accordance with various embodiments, a method 300 for managing modes of operation for a hybrid vehicle 100 may include determining a position of a hybrid vehicle 100 at 302. In accordance with an embodiment, the position of the hybrid vehicle 100 may be already known, i.e. based upon a GPS input or knowledge about where the last operation of the hybrid vehicle 100 ended. At 304, at least one condition relating to use of the hybrid vehicle 100 is analyzed by the processing module 204. Based upon the analysis of at least one of these conditions, at 306 a mode of operation may be altered or selected for use by the management module 206 with the hybrid vehicle 100. Among the conditions that may be used for analysis may include, for example, at least one of a current position of the hybrid vehicle, anticipated position of the hybrid vehicle, past position of the hybrid vehicle, terrain along the path on which the hybrid vehicle is being operated, a history of operation of the hybrid vehicle, a current date and/or time, speed of the hybrid vehicle, and/or input from an operator of the hybrid vehicle.

Figure 4:
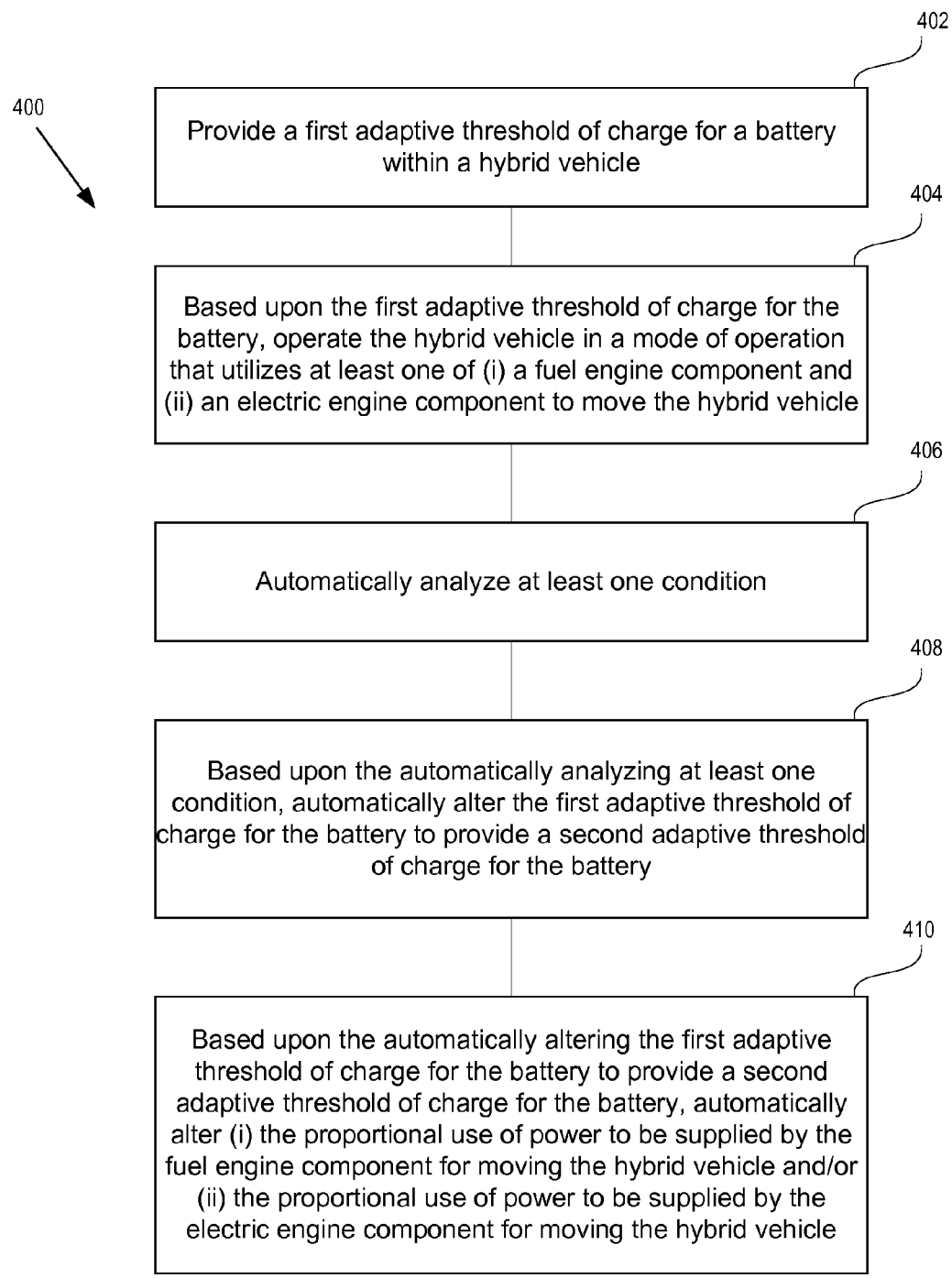
FIG. 4 is flow diagram of another method for managing modes of operation for a hybrid vehicle.

Referring now to FIG. 4, in accordance with various embodiments, a method 400 for managing modes of operation for a hybrid vehicle 100 includes, at 402, providing a first adaptive threshold of charge for a battery within a hybrid vehicle. At 404, the method 400 includes, based upon the first adaptive threshold of charge for the battery, operating the hybrid vehicle in a mode of operation that utilizes at least one of (i) a fuel engine component and (ii) an electric engine component to move the hybrid vehicle. The mode of operation involves (i) a proportional use of power to be supplied by the fuel engine component for moving the hybrid vehicle and/or (ii) a proportional use of power to be supplied by the electric engine component for moving the hybrid vehicle and power supplied by the electric engine component is based upon energy supplied by the battery. At 406, the method 400 includes automatically analyzing at least one condition relating to a position of the hybrid vehicle. At 408, the method 400 includes, based upon the automatically analyzing at least one condition relating to the position of the hybrid vehicle, automatically altering the first adaptive threshold of charge for the battery to provide a second adaptive threshold of charge for the battery. At 410, the method 400 includes, based upon the automatically altering the first adaptive threshold of charge for the battery to provide a second adaptive threshold of charge for the battery, automatically altering (i) the proportional use of power to be supplied by the fuel engine component for moving the hybrid vehicle and/or (ii) the proportional use of power to be supplied by the electric engine component for moving the hybrid vehicle.

Although certain embodiments have been illustrated and described herein for purposes of description of an illustrative embodiment, it is noted that a wide variety of alternate and/or equivalent embodiments or implementations calculated to achieve the same purposes may be substituted for the embodiments illustrated and described without departing from the scope of the present disclosure. Those with skill in the art will readily appreciate based on the foregoing that embodiments in accordance with the present disclosure may be implemented in a very wide variety of ways. This application is intended to cover any adaptations or variations of the embodiments discussed herein. Therefore, it is manifestly intended that embodiments in accordance with the present disclosure be limited only by the claims and the equivalents thereof.

What is claimed is:

1. A method comprising:
providing a first adaptive threshold of charge for a battery within a hybrid vehicle;
based upon the first adaptive threshold of charge for the battery, operating the hybrid vehicle in a mode of operation that utilizes at least one of (i) a fuel engine component and (ii) an electric engine component to move the hybrid vehicle, wherein the mode of operation involves one or both of (i) a proportional use of power to be supplied by the fuel engine component for moving the hybrid vehicle and (ii) a proportional use of power to be supplied by the electric engine component for moving the hybrid vehicle, and wherein power supplied by the electric engine component is based upon energy supplied by the battery;

automatically analyzing at least one condition;

based upon the automatically analyzing at least one condition, automatically altering the first adaptive threshold of charge for the battery to provide a second adaptive threshold of charge for the battery that is different from the first adaptive threshold; and based upon the automatically altering the first adaptive threshold of charge for the battery to provide a second adaptive threshold of charge for the battery, automatically altering one or both of (i) the proportional use of power to be supplied by the fuel engine component for moving the hybrid vehicle and (ii) the proportional use of power to be supplied by the electric engine component for moving the hybrid vehicle.

2. The method of claim 1, wherein the at least one condition comprises charge of the battery one of (i) reaching the first adaptive threshold of charge for the battery or (ii) dropping below the first adaptive threshold of charge for the battery.

3. The method of claim 2, wherein the second adaptive threshold of charge for the battery is a default adaptive threshold of charge for the battery.

4. The method of claim 1, wherein the first adaptive threshold of charge for the battery is a default adaptive threshold of charge for the battery.

5. The method of claim 1, wherein the at least one condition comprises at least one of a current position of the hybrid vehicle, an anticipated position of the hybrid vehicle, a past position of the hybrid vehicle, a history of operation of the hybrid vehicle, terrain along a path on which the hybrid vehicle is being operated, a current date, a current time, speed of the hybrid vehicle, and input from an operator of the hybrid vehicle.

6. The method of claim 1, further comprising based upon changing state of the at least one condition, returning to a default adaptive threshold of charge for the battery.

7. The method of claim 1, further comprising receiving information from a traffic condition source and wherein the analyzing at least one condition includes analyzing at least the information.

8. The method of claim 1, further comprising:
automatically determining a current position of the hybrid vehicle,
wherein the at least one condition comprises at least one of the current position of the hybrid vehicle and an anticipated position of the hybrid vehicle.

9. An apparatus comprising:
a data module configured to at least one of obtain and store data relating to at least one condition;
a processing module configured to analyze the data relating to at least one condition; and
a management module configured to
based upon analyzing the data relating to at least one condition, alter a first adaptive threshold of charge for a battery of a hybrid vehicle to provide a second adaptive threshold of charge for the battery, wherein the first adaptive threshold is different from the second adaptive threshold;
based upon the first adaptive threshold of charge for the battery, define a proportional utilization of different engine components by the hybrid vehicle, wherein the proportional utilization comprises at least one of (i) a proportional use of power to be supplied by a fuel engine component for moving the hybrid vehicle and (ii) a proportional use of power to be supplied by an electric engine component for moving the hybrid vehicle, and wherein power supplied by the electric engine component is based upon energy supplied by the battery, and based upon altering the first adaptive threshold of charge for the battery of the hybrid vehicle to provide a second adaptive threshold of charge for the battery, alter one or both of (i) the proportional use of power to be supplied by the fuel engine component for moving the hybrid vehicle and (ii) the proportional use of power to be supplied by the electric engine component for moving the hybrid vehicle.

10. The apparatus of claim 9, wherein the at least one condition comprises charge of the battery one of (i) reaching the first adaptive threshold of charge for the battery or (ii) dropping below the first adaptive threshold of charge for the battery.

11. The apparatus of claim 10, wherein the second adaptive threshold of charge for the battery is a default adaptive threshold of charge for the battery.

12. The apparatus of claim 9, wherein the first adaptive threshold of charge for the battery is a default adaptive threshold of charge for the battery.

13. The apparatus of claim 9, wherein one or more of (i) the data module, (ii) the processing module and (iii) the management module are realized within a single module.

14. The apparatus of claim 9, wherein the at least one condition comprises at least one of a current position of the hybrid vehicle, an anticipated position of the hybrid vehicle, a past position of the hybrid vehicle, a history of operation of the hybrid vehicle, terrain along a path on which the hybrid vehicle is being operated, a current date, a current time, speed of the hybrid vehicle, and input from an operator of the hybrid vehicle.

15. The apparatus of claim 9, wherein the management module is further configured to, based upon changing state of the at least one condition, return to a default adaptive threshold of charge for the battery.

16. The apparatus of claim 9, wherein:
the data module is further configured to receive information from a traffic condition source; and
the processing module being configured to analyze the data includes the processing module being configured to analyze at least the information.

17. The apparatus of claim 9, wherein:
the data module is further configured to determine a current position of the hybrid vehicle; and
the at least one condition comprises at least one of the current position of the hybrid vehicle and an anticipated position of the hybrid vehicle.

18. A hybrid vehicle comprising:
a chassis;
a fuel engine component coupled to the chassis;
an electric engine component coupled to the chassis;
a battery associated with at least one of (i) the fuel engine component and (ii) the electric engine component; and
a control system associated with (i) the fuel engine component, (ii) the electric engine component and (iii) the battery, the control system comprising:
a data module configured to at least one of obtain and store data relating to at least one condition;
a processing module configured to analyze the data relating to at least one condition; and
a management module configured to
based upon analyzing the data relating to at least one condition, alter a first adaptive threshold of charge for the battery of the hybrid vehicle to provide a second adaptive threshold of charge for the battery, wherein the first adaptive threshold is different from the second adaptive threshold;

based upon the first adaptive threshold of charge for the battery, define a proportional utilization of different engine components by the hybrid vehicle, wherein the proportional utilization comprises at least one of (i) a proportional use of power to be supplied by a fuel engine component for moving the hybrid vehicle and (ii) a proportional use of power to be supplied by an electric engine component for moving the hybrid vehicle, and wherein power supplied by the electric engine component is based upon energy supplied by the battery, and based upon altering the first adaptive threshold of charge for the battery of the hybrid vehicle to provide a second adaptive threshold of charge for the battery, alter one or both of (i) the proportional use of power to be supplied by the fuel engine component for moving the hybrid vehicle and (ii) the proportional use of power to be supplied by the electric engine component for moving the hybrid vehicle.

19. The hybrid vehicle of claim 18, wherein the at least one condition comprises charge of the battery one of (i) reaching the first adaptive threshold of charge for the battery or (ii) dropping below the first adaptive threshold of charge for the battery.

20. The hybrid vehicle of claim 19, wherein the second adaptive threshold of charge for the battery is a default adaptive threshold of charge for the battery.

21. The hybrid vehicle of claim 18, wherein the first adaptive threshold of charge for the battery is a default adaptive threshold of charge for the battery.

22. The hybrid vehicle of claim 18, wherein the at least one condition comprises at least one of a current position of the hybrid vehicle, an anticipated position of the hybrid vehicle, a past position of the hybrid vehicle, a history of operation of the hybrid vehicle, terrain along a path on which the hybrid vehicle is being operated, a current date, a current time, speed of the hybrid vehicle, and input from an operator of the hybrid vehicle.

23. The hybrid vehicle of claim 18, wherein the management module is further configured to, based upon changing state of the at least one condition, return to a default adaptive threshold of charge for the battery.

24. The hybrid vehicle of claim 18, wherein:
the data module is further configured to receive information from a traffic condition source; and
the analyzing the data includes analyzing at least the information.

25. The hybrid vehicle of claim 18, wherein:
the data module is further configured to determine a current position of the hybrid vehicle; and
the at least one condition comprises at least one of the current position of the hybrid vehicle and an anticipated position of the hybrid vehicle.

* * * * *